(12) United States Patent
He et al.

(10) Patent No.: US 9,152,708 B1
(45) Date of Patent: Oct. 6, 2015

(54) TARGET-VIDEO SPECIFIC CO-WATCHED VIDEO CLUSTERS

(75) Inventors: Yu He, Sunnyvale, CA (US); David P. Stoutamire, Redwood City, CA (US); Zhihui Chen, Menlo Park, CA (US); Hao He, Union City, CA (US)

(73) Assignee: Google Inc., Mountain View, CA (US)

( * ) Notice: Subject to any disclaimer, the term of this patent is extended or adjusted under 35 U.S.C. 154(b) by 81 days.

(21) Appl. No.: 12/637,635

(22) Filed: Dec. 14, 2009

(51) Int. Cl.
*G06F 17/30* (2006.01)

(52) U.S. Cl.
CPC ...... *G06F 17/3082* (2013.01); *G06F 17/30781* (2013.01)

(58) Field of Classification Search
CPC .......... G06F 17/3082; G06F 17/30817; G06F 17/30823
USPC ........................................................ 707/738
See application file for complete search history.

(56) References Cited

U.S. PATENT DOCUMENTS

| | | |
|---|---|---|
| 5,649,060 A | 7/1997 | Ellozy |
| 5,664,227 A | 9/1997 | Mauldin et al. |
| 5,724,521 A | 3/1998 | Dedrick |
| 5,740,549 A | 4/1998 | Reilly |
| 5,848,397 A | 12/1998 | Marsh |
| 5,946,658 A | 8/1999 | Miyazawa et al. |
| 5,948,061 A | 9/1999 | Merriman |
| 6,026,368 A | 2/2000 | Brown |
| 6,044,376 A | 3/2000 | Kurtzman |
| 6,078,914 A | 6/2000 | Redfern |
| 6,091,416 A | 7/2000 | Cragun |
| 6,144,944 A | 11/2000 | Kurtzman |
| 6,167,382 A | 12/2000 | Sparks |
| 6,188,398 B1 | 2/2001 | Collins-Rector et al. |
| 6,269,361 B1 | 7/2001 | Davis |
| 6,282,548 B1 | 8/2001 | Burner et al. |
| 6,282,713 B1 | 8/2001 | Kitsukawa et al. |
| 6,393,158 B1 | 5/2002 | Gould et al. |
| 6,401,075 B1 | 6/2002 | Mason |
| 6,698,020 B1 | 2/2004 | Zigmond et al. |
| 6,771,290 B1 | 8/2004 | Hoyle |
| 6,847,977 B2 | 1/2005 | Abajian |

(Continued)

FOREIGN PATENT DOCUMENTS

| | | |
|---|---|---|
| CN | 1728781 | 2/2006 |
| JP | 2003-242372 | 8/2003 |

(Continued)

OTHER PUBLICATIONS

Baluja et al. "Video Suggestion and Discovery for YouTube: Taking Random Walks through the View Graph", ACM, WWW 2008, Apr. 21-25, 2008.*

(Continued)

*Primary Examiner* — Brittany N Allen
(74) *Attorney, Agent, or Firm* — Fish & Richardson P.C.

(57) ABSTRACT

Methods, systems, and apparatus, including computer programs encoded on computer storage media, for clustering videos and using video clusters to present content. One method includes generating target video-specific clusters of co-watched videos for target videos, according to keywords for each target video, and storing data associating the target video with its clusters. The clusters can then be used in various applications, including identifying related videos, augmenting video search results, re-ordering video search results, and identifying content for a target video.

36 Claims, 10 Drawing Sheets

(56) References Cited

U.S. PATENT DOCUMENTS

| | | | |
|---|---|---|---|
| 6,976,028 B2 | 12/2005 | Fenton et al. | |
| 6,978,470 B2 | 12/2005 | Swix et al. | |
| 6,985,882 B1 | 1/2006 | Del Sesto | |
| 6,990,496 B1 | 1/2006 | McGee, III et al. | |
| 6,996,564 B2 | 2/2006 | Lester et al. | |
| 7,039,599 B2 | 5/2006 | Merriman | |
| 7,043,746 B2 | 5/2006 | Ma | |
| 7,055,103 B2 | 5/2006 | Lif | |
| 7,058,963 B2 | 6/2006 | Kendall et al. | |
| 7,136,875 B2 | 11/2006 | Anderson | |
| 7,158,986 B1* | 1/2007 | Oliver et al. | 1/1 |
| 7,165,069 B1 | 1/2007 | Kahle et al. | |
| 7,266,198 B2 | 9/2007 | Medvinsky | |
| 7,383,258 B2 | 6/2008 | Harik et al. | |
| 7,454,509 B2 | 11/2008 | Boulter et al. | |
| 7,467,218 B2 | 12/2008 | Gould et al. | |
| 7,506,356 B2 | 3/2009 | Gupta et al. | |
| 7,555,557 B2 | 6/2009 | Bradley et al. | |
| 7,559,017 B2 | 7/2009 | Datar et al. | |
| 7,584,490 B1 | 9/2009 | Schlack | |
| 7,593,965 B2 | 9/2009 | Gabriel | |
| 7,613,691 B2 | 11/2009 | Finch | |
| 7,630,021 B2 | 12/2009 | Matsuzaka et al. | |
| 7,657,519 B2 | 2/2010 | Anderson et al. | |
| 7,769,819 B2 | 8/2010 | Lerman et al. | |
| 7,806,329 B2 | 10/2010 | Dmitriev et al. | |
| 7,809,802 B2 | 10/2010 | Lerman et al. | |
| 7,853,601 B2 | 12/2010 | Kadambi et al. | |
| 7,912,217 B2 | 3/2011 | Baugher et al. | |
| 7,937,724 B2 | 5/2011 | Clark et al. | |
| 7,966,632 B1 | 6/2011 | Pan et al. | |
| 7,986,372 B2 | 7/2011 | Ma et al. | |
| 8,041,601 B2 | 10/2011 | Fikes et al. | |
| 8,132,202 B2 | 3/2012 | Swix et al. | |
| 8,156,010 B2 | 4/2012 | Gopalakrishnan | |
| 8,156,176 B2 | 4/2012 | Lerman et al. | |
| 8,196,166 B2 | 6/2012 | Roberts et al. | |
| 8,243,017 B2 | 8/2012 | Brodersen et al. | |
| 8,243,203 B2 | 8/2012 | Suh | |
| 8,689,251 B1 | 4/2014 | Heath | |
| 8,719,865 B2 | 5/2014 | Moonka et al. | |
| 2001/0003214 A1 | 6/2001 | Shastri et al. | |
| 2002/0002525 A1 | 1/2002 | Arai et al. | |
| 2002/0065813 A1* | 5/2002 | Scanlon et al. | 707/3 |
| 2002/0116716 A1 | 8/2002 | Sideman | |
| 2002/0147782 A1 | 10/2002 | Dimitrova et al. | |
| 2003/0046399 A1* | 3/2003 | Boulter et al. | 709/228 |
| 2003/0061305 A1 | 3/2003 | Copley et al. | |
| 2003/0093790 A1* | 5/2003 | Logan et al. | 725/38 |
| 2003/0126472 A1 | 7/2003 | Banzhof | |
| 2003/0154128 A1 | 8/2003 | Liga et al. | |
| 2003/0188308 A1 | 10/2003 | Kizuka | |
| 2003/0233460 A1* | 12/2003 | Drucker et al. | 709/228 |
| 2004/0059708 A1 | 3/2004 | Dean | |
| 2004/0093327 A1 | 5/2004 | Anderson | |
| 2004/0133469 A1 | 7/2004 | Chang | |
| 2004/0226038 A1 | 11/2004 | Choi | |
| 2004/0267806 A1 | 12/2004 | Lester et al. | |
| 2005/0028190 A1 | 2/2005 | Rodriguez et al. | |
| 2005/0034151 A1 | 2/2005 | Abramson | |
| 2005/0091311 A1 | 4/2005 | Lund et al. | |
| 2005/0114198 A1 | 5/2005 | Koningstein et al. | |
| 2005/0120127 A1 | 6/2005 | Bradley et al. | |
| 2005/0125374 A1* | 6/2005 | Curtis et al. | 707/1 |
| 2005/0203878 A1* | 9/2005 | Brill et al. | 707/3 |
| 2005/0207442 A1 | 9/2005 | Zoest et al. | |
| 2006/0013555 A1 | 1/2006 | Poslinski | |
| 2006/0015904 A1 | 1/2006 | Marcus | |
| 2006/0026628 A1 | 2/2006 | Wan et al. | |
| 2006/0053470 A1 | 3/2006 | Colter et al. | |
| 2006/0059510 A1 | 3/2006 | Huang et al. | |
| 2006/0074902 A1* | 4/2006 | Anderson et al. | 707/5 |
| 2006/0090182 A1 | 4/2006 | Horowitz et al. | |
| 2006/0106709 A1 | 5/2006 | Chickering et al. | |
| 2006/0129533 A1 | 6/2006 | Purvis | |
| 2006/0140584 A1 | 6/2006 | Ellis et al. | |
| 2006/0179453 A1 | 8/2006 | Kadie et al. | |
| 2006/0195318 A1 | 8/2006 | Stanglmayr | |
| 2006/0214947 A1 | 9/2006 | Boose et al. | |
| 2006/0221222 A1 | 10/2006 | Hirasawa | |
| 2006/0224496 A1 | 10/2006 | Sandholm et al. | |
| 2006/0224693 A1 | 10/2006 | Gaidemak et al. | |
| 2006/0259588 A1 | 11/2006 | Lerman et al. | |
| 2006/0259589 A1 | 11/2006 | Lerman et al. | |
| 2006/0271977 A1 | 11/2006 | Lerman et al. | |
| 2006/0277567 A1 | 12/2006 | Kinnear | |
| 2007/0073579 A1 | 3/2007 | Immorlica et al. | |
| 2007/0078708 A1 | 4/2007 | Yu et al. | |
| 2007/0078709 A1 | 4/2007 | Rajaram | |
| 2007/0089127 A1 | 4/2007 | Flickinger et al. | |
| 2007/0100690 A1 | 5/2007 | Hopkins | |
| 2007/0112630 A1 | 5/2007 | Lau et al. | |
| 2007/0113240 A1 | 5/2007 | McLean et al. | |
| 2007/0130602 A1 | 6/2007 | Gulli et al. | |
| 2007/0157228 A1 | 7/2007 | Bayer | |
| 2007/0159522 A1 | 7/2007 | Neven | |
| 2007/0204310 A1 | 8/2007 | Hua et al. | |
| 2007/0245242 A1 | 10/2007 | Yagnik | |
| 2007/0277205 A1 | 11/2007 | Grannan | |
| 2007/0282893 A1 | 12/2007 | Smith et al. | |
| 2007/0288518 A1 | 12/2007 | Crigler et al. | |
| 2007/0288950 A1 | 12/2007 | Downey et al. | |
| 2008/0004948 A1 | 1/2008 | Flake et al. | |
| 2008/0005166 A1 | 1/2008 | Cragun et al. | |
| 2008/0021775 A1 | 1/2008 | Lerman et al. | |
| 2008/0027798 A1 | 1/2008 | Ramamurthi et al. | |
| 2008/0033806 A1 | 2/2008 | Howe et al. | |
| 2008/0066107 A1 | 3/2008 | Moonka | |
| 2008/0092159 A1 | 4/2008 | Dmitriev et al. | |
| 2008/0092182 A1 | 4/2008 | Conant | |
| 2008/0098420 A1 | 4/2008 | Khivesara et al. | |
| 2008/0120324 A1 | 5/2008 | Davis | |
| 2008/0139112 A1 | 6/2008 | Sampath et al. | |
| 2008/0140502 A1 | 6/2008 | Birnholz et al. | |
| 2008/0155585 A1 | 6/2008 | Craner et al. | |
| 2008/0163071 A1 | 7/2008 | Abbott et al. | |
| 2008/0189169 A1 | 8/2008 | Turpin et al. | |
| 2008/0201361 A1 | 8/2008 | Castro et al. | |
| 2008/0229353 A1 | 9/2008 | Morris et al. | |
| 2008/0263583 A1 | 10/2008 | Heath | |
| 2008/0263673 A1 | 10/2008 | Brun et al. | |
| 2008/0270883 A1 | 10/2008 | Friedman et al. | |
| 2008/0276266 A1 | 11/2008 | Huchital et al. | |
| 2008/0300974 A1 | 12/2008 | Bhandari et al. | |
| 2008/0306999 A1 | 12/2008 | Finger et al. | |
| 2008/0320512 A1 | 12/2008 | Knight | |
| 2009/0006375 A1 | 1/2009 | Lax et al. | |
| 2009/0049469 A1 | 2/2009 | Small | |
| 2009/0055375 A1 | 2/2009 | Oestlien et al. | |
| 2009/0070836 A1 | 3/2009 | Aaby et al. | |
| 2009/0164419 A1 | 6/2009 | Taylor et al. | |
| 2009/0165041 A1 | 6/2009 | Penberthy et al. | |
| 2009/0287574 A1 | 11/2009 | Kane | |
| 2010/0037149 A1 | 2/2010 | Heath | |
| 2010/0125871 A1 | 5/2010 | Liao et al. | |
| 2010/0174607 A1 | 7/2010 | Henkin et al. | |
| 2010/0186028 A1 | 7/2010 | Moore et al. | |
| 2010/0278453 A1 | 11/2010 | King | |
| 2011/0131595 A1* | 6/2011 | Xue et al. | 725/9 |
| 2011/0289531 A1 | 11/2011 | Moonka et al. | |
| 2013/0226690 A1 | 8/2013 | Gross | |

FOREIGN PATENT DOCUMENTS

| | | |
|---|---|---|
| JP | 2006-155384 | 6/2006 |
| KR | 10-2002-0015858 | 3/2002 |
| KR | 10-2004-0069324 | 8/2004 |
| KR | 10-2006-0099253 | 9/2006 |
| WO | WO97/21183 | 6/1997 |
| WO | WO9721183 A1 | 6/1997 |
| WO | WO99/66719 | 12/1999 |
| WO | WO01/50296 | 7/2001 |

(56) References Cited

FOREIGN PATENT DOCUMENTS

| WO | WO03/084219 | 10/2003 |
|---|---|---|
| WO | WO2006/111912 | 10/2006 |
| WO | WO2008-072874 | 6/2008 |

OTHER PUBLICATIONS

PC WORLD, Steve Bass's Tips & Tweaks., http://blogs.pcworld.com/tipsandtweaks/archives/006418.html, Downloaded Feb. 14, 2011, 2 Pages.
EP Communication from European Application No. 08781112.1 mailed Oct. 26, 2010, 4 pages.
European Search Report issued in international application No. 08756776.4 on Apr. 20, 2001, 3 pages.
Communication Pursuant to Article 94(3) EPC issued in international application No. 08756776.4 on Apr. 29, 2011, 7 pages.
PCT International Search Report and Written Opinion, PCT/US2008/062442, Jul. 14, 2008.
PCT International Search Report and Written Opinion, PCT/US2008/062103, Aug. 26, 2008.
International Search Report and Written Opinion for PCT Application No. PCT/US2008/068624, dated Aug. 4, 2009, 12 pages.
International Preliminary Report on Patentability issued in international application No. PCT/US2008/062103 on Nov. 3, 2009, 6 pages.
International Preliminary Report on Patentability issued in international application No. PCT/US2008/062442 on Nov. 3, 2009, 7 pages.
International Preliminary Report on Patentability issued in international application No. PCT/US2008/066175 on Dec. 11, 2009, 7 pages.
International Preliminary Report on Patentability for PCT Application No. PCT/US2008/068624, dated Jan. 5, 2010, 6 pages.
Business Wire, "Global Network, Inc. Enters Into Agreement in Principle With Major Advertising Agency", Oct. 4, 1999.
Greg Sandoval: "YouTube: Too rough for advertisers?" [online] [retrieved on Apr. 21, 2006]. Retrieved from the Internet: < URL: http://www.news.com >, 2 pages.
Lowe, D.G., "Object Recognition from Local Scale-Invariant Features," Proc. Seventh IEEE Int'l Conf on Computer Vision ICCV 99, Kerkyra, Greece, Sep. 20-27, 1999, pp. 1150-1157.
Raoul EMME, International Search Report and the Written Opinion in PCT/US2007/078299, mailed Feb. 5, 2008, 29 pages.
So Young Doo, International Search Report and the Written Opinion in PCT/US2008/060859, mailed Sep. 26, 2008, 10 pages.
Dorothée Mülhausen, International Preliminary Report on Patentability in PCT/US2007/078299, mailed Mar. 26, 2009, 14 pages.
International Preliminary Report on Patentability for PCT Application No. PCT/US2008/066175, mailed Dec. 23, 2009, 7 pgs.
International Search Report and Written Opinion from International Application No. PCT/US08/66175, mailed Jun. 9, 2009, 8 pgs.
International Preliminary Report on Patentability from International Application No. PCT/US2008/073914, mailed Mar. 4, 2010, 7 pgs.
International Search Report and Written Opinion from International Application No. PCT/US2008/073914 mailed Jun. 23, 2009, 14 pgs.
Masashi Honda, International Preliminary Report on Patentability in PCT/US2008/060859, mailed Oct. 29, 2009, 6 pages.
Mahesh Dwivedi, International Preliminary Report on Patentability for PCT Application No. PCT/US2008/068624, dated Jan. 5, 2010, 6 pages.
Jung Jin Kim, International Search Report and the Written Opinion in PCT/US2009/052866, mailed Mar. 18, 2010, 11 pages.
Authorized officer Simin Baharlou, International Preliminary Report on Patentability in PCT/US2009/052866, mailed Feb. 17, 2011, 7 pages.
Supplementary EP Search Report in EP 09 80 5508, mailed Nov. 3, 2011, 5 pages.
Chinese Office Action in Chinese Application No. 200980130845.X, dated Dec. 27, 2011, 17 pages.
Supplementary EP Search Report in EP 08 74 6298, mailed Jan. 23, 2012, 7 pages.
JP Office Action in Application No. 2009-528455, dated Aug. 13, 2012, 7 pages.
"Ad Serving with RealSystem™ G2," RealNetworks, 1999, 38 pages, [online] [Retrieved on Feb. 13, 2009] Retrieved from the internet <URL:http://service.real.com/help/library/blueprints/adserve/adserve.htm>.
"www.Scanscout.com," 2 pages, Archived on Apr. 7, 2007 on web.archive.org [online][Tretived on Oct. 19, 2009] Retrived from the internet: <URL:http://web.archive.org/web/20070407233129/http://www.scanscout.com/>.
"www.BrightRoll.com," 2 pages, Archived on Apr. 29, 2007 on web.archive.org [online][Retrieved on Oct. 19, 2009] Retrieved from the internet: <URL:http://web.archive.org/web/20070429110654/http://www.birghtroll.com>.
AJAX Activity Indicators, Archived on Dec. 25, 2006 on www.web.archive.org [online] [Retrieved on Jun. 10, 2008] Retrieved from the internet <URL:http://web.archive.org/web/20061225134638/http://www/napyfab.com/ajax-indicators/>.
Strange, Adario, "VideoEgg Exec: YouTube's New Ads are Just Like Ours," [online], [Retrieved Jun. 2008, pp. 1-8,] Retrieved from the internet <URL://http://blog.wired.com/business/2007/08/network-wars-vi.html>.
"Overlay & Video AdType," ScanScout, 2007, [online] [Retrieved on Jul. 15, 2008] Retrieved from the internet <URL://demo.scanscount.com/livedemo.shtml?adType=overlay&videoAdType=rightSide&ss . . . >.
Riley, D., "Contextual In-Video Advertising: ScanScout," May 14, 2007, [online] [Retrieved on Jul. 15, 2008] Retrieved from the internet <URL://www.techcrunch.com/2007/05/14/contextual-in-video-advertising-scanscout/.>.
Delaney, Kevin J., "Start-Ups See to Cash in on Web-Video Ads", Wall Street Journal, Mar. 2, 2007,[online] [Retrieved Sep. 3, 2008] Retrieved from the internet <URL://www.scanscout.com/wsj-070302.html]>.
"www.YuMe.com," 2009, 1 Page, [online][Retrieved on Oct. 19, 2009] Retrieved from the internet: <URL:http://www.yume.com>.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, Adknowledge, Aug. 1998.
AdKnowledge Market Match Planner: Reviewer's Guide, AdKnowledge, May 1998.
Ad-Star.com website archive from www.Archive.org. Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Dedrick, R., A Consumption Model for Targeted Electronic Advertising, Intel Architecture Labs, IEEE, 1995.
Dedrick, R., Interactive Electronic Advertising, IEEE, 1994.
Information Access Technologies, Inc., Aaddzz brochure, "The Best Way to Buy and Sell Web Advertising Space," © 1997.
Information Access Technologies, Inc., Aaddzz.com website archive from www.Archive.org., archived on Jan. 30, 1998.
International Preliminary Report on Patentability from International Application No. PCT/US2008/073914 mailed Mar. 4, 2010, 7 pages.
International Search Report and Written Opinion from International Application No. PCT/US2008/073914 mailed Jun. 23, 2009, 14 pages.
Request for Reexamination of U.S. Patent No. 6,829,587 B2, Control No. 95/001,068.
Request for Reexamination of U.S. Patent No. 6,446,045 B1, Control No. 95/001,061.
Request for Reexamination of U.S. Patent 7,240,025 B2, Control No. 95/001,073.
Request for Reexamination of U.S. Patent No. 7,249,059 B2, Control No. 95/001,069.
Zeff, R., et al., Advertising on the Internet, 2nd Ed., John Wiley & Sons, 1999.
Korean Office Action in Korean Application No. 10-2009-7007416, mailed Mar. 10, 2014, 13 pages (with English translation).
Communication pursuant to Article 94(3) EPC for EP Appl. No. EP 07 842 355.5-1502 dated Mar. 14, 2013, 6 pages.
Japanese Second Office Action for JP 2009-528455 dated Jun. 18, 2013 w/English translation,4 pages.

\* cited by examiner

TARGET-VIDEO SPECIFIC CO-WATCHED VIDEO CLUSTERS

BACKGROUND

This specification relates to presenting content.

Users can access videos through video hosting websites. These video hosting websites allow users to search for videos, for example, by submitting a query containing one or more keywords. Once a user identifies a video of interest, these video hosting websites display the video, for example, on a video watch page. The watch page includes the video itself, and may also include other information. For example, the watch page can include links to related videos for the video being displayed or advertisements relevant to the video being displayed.

SUMMARY

In general, one aspect of the subject matter described in this specification can be embodied in methods that include the actions of maintaining a store of data, the data associating each of a plurality of target videos with a respective plurality of co-watched videos for the target video, wherein each co-watched video for a target video was viewed by a user within a time window of when the same user viewed the target video, the data further associating each co-watched video with one or more keywords for the co-watched video; generating, for each target video in the plurality of target videos, one or more target video specific clusters of co-watched videos for the target video, wherein the clusters are generated according to the keywords for each co-watched video; and storing data identifying the clusters for each target video, wherein the data indexes the clusters for each target video according to the corresponding target video. Other embodiments of this aspect include corresponding systems, apparatus, and computer programs recorded on computer storage devices, each configured to perform the operations of the methods.

These and other embodiments can each optionally include one or more of the following features. The method can further include selecting content related to a first target video according to the clusters for the first target video. The content can be a first co-watched video selected from one of the clusters for the first target video.

The method can further include selecting a plurality of related videos for a first target video, the selecting comprising identifying the clusters for the first target video from the stored data, and selecting a co-watched video from each of the clusters. The method can further include, for each target video: determining a score for each cluster associated with the target video; and identifying one or more clusters as being off-topic for the target video according to the scores.

Each co-watched cluster can be associated with one or more keywords. The method can further include receiving input requesting presentation of a first target video; identifying content to present with the first target video according to one or more of the keywords associated with the clusters for the first target video; and presenting the first target video along with the content. The content can be an advertisement.

The method can further include receiving data identifying a set of initial videos responsive to a query; selecting a cluster of co-watched videos for an initial target video selected from the initial videos, wherein the cluster of co-watched videos is selected according to how well the keywords associated with the cluster match the query; and presenting one or more of the initial videos and one or more of the co-watched videos from the selected cluster in response to the query. The method can further include receiving data identifying a set of target videos responsive to a query, wherein the target videos are ordered according to a respective result score for each target video, and wherein the target videos include a first target video having a first rank and a second target video having a second rank below the first rank; determining that the second target video is in a cluster of co-watched videos for the first target video; and presenting the target videos in a different order according to a score adjustment for the second target video.

Each co-watched video for a target video can have been viewed by a user after the user submitted a first search query, and the target video can have been viewed by the user after the user submitted a second search query, and the first search query can be similar to the second search query. One or more of the co-watched videos for a target video can have been selected by a user from a watch page on which the user viewed the target video. The time window can be defined by an amount of time. The time window can be defined by a number of videos viewed by the user. The keywords for each video can include keywords from a title associated with the video. The keywords for each video can include a query submitted by a user, wherein the user viewed the video after the video was presented as a search result for the query.

In general, another aspect of the subject matter described in this specification can be embodied in methods that include the actions of storing data for each of a plurality of target videos, the data for each target video associating the target video with one or more clusters of co-watched video for the target video; receiving input from a user requesting presentation of a first target video; selecting a plurality of related videos for the first target video, the selecting comprising: identifying two or more of the clusters for the first target video from the stored data; and selecting a co-watched video from each of the identified clusters; and presenting the first target video along with a representation of each of the plurality of related videos. Other embodiments of this aspect include corresponding systems, apparatus, and computer programs recorded on computer storage devices, each configured to perform the operations of the methods.

These and other embodiments can each optionally include one or more of the following features. The method can further include identifying one or more clusters as being off-topic for the target video, wherein the identified clusters are each cluster for the first target video except the off-topic clusters. Identifying one or more clusters as being off-topic for the target video can include determining a cluster score for each of clusters, wherein the cluster score is determined from a respective co-watched score for each video in the cluster; and identifying each cluster whose cluster score does not satisfy a threshold as an off-topic cluster.

The data for each target video can further include a video score for each video in each cluster. Selecting a co-watched video from each of one or more of the clusters can include selecting the co-watched video in each of the one or more clusters having a highest video score of co-watched videos in the cluster. The video score for each co-watched video in each cluster can be derived from a co-watched score for the co-watched video and the target video.

The representation of each of the plurality of related videos can be a selectable user interface element on a graphical user interface. The selectable user interface element can include a hyperlink.

Each co-watched video for a target video can have been viewed by a user within a time window of when the same user viewed the target video. Each co-watched video for a target video can have been viewed by a user after the user submitted a first search query, and the target video can have been viewed by the user after the user submitted a second search query, and the first search query can be similar to the second search query. One or more of the co-watched videos for a target video can have been selected by a user from a watch page on which the user viewed the target video. The time window can be defined by an amount of time. The time window can be defined by a number of videos viewed by the user.

In general, another aspect of the subject matter described in this specification can be embodied in methods that include the actions of storing data for each of a plurality of target videos, the data for each target video identifying one or more clusters of co-watched videos for the target video, wherein each cluster is associated with one or more keywords for the cluster; receiving input requesting presentation of a first target video; identifying first content to present with the first target video, wherein the first content is content matching one or more keywords for the clusters of co-watched videos for the first target video; and presenting the first target video along with the first content. Other embodiments of this aspect include corresponding systems, apparatus, and computer programs recorded on computer storage devices, each configured to perform the operations of the methods.

These and other embodiments can each optionally include one or more of the following features. Identifying first content to present with the first target video can include: storing associations between keywords and content; matching one or more of the keywords for the clusters of co-watched videos for the target video to one or more keywords associated with first content; and identifying the first content to present with the first target video. Matching one or more of the keywords for the clusters of co-watched videos for the target video to one or more keywords associated with the first content can include: identifying one or more of the clusters of co-watched videos as off-topic clusters; and matching one or more of the keywords for clusters other than the off-topic clusters to the keywords associated with the first content. Identifying one or more clusters as being off-topic for the target video can include determining a cluster score for each of the clusters, wherein the cluster score is determined from a respective co-watched score for each video in the cluster; and identifying each cluster whose cluster score does not satisfy a threshold as an off-topic cluster. The first content can be an advertisement.

Each co-watched video for a target video can have been viewed by a user within a time window of when the same user viewed the target video. Each co-watched video for a target video can have been viewed by a user after the user submitted a first search query, and the target video can have been viewed by the user after the user submitted a second search query, and the first search query can be similar to the second search query. One or more of the co-watched videos for a target video can have been selected by a user from a watch page on which the user viewed the target video. The time window can be defined by an amount of time. The time window can be defined by a number of videos viewed by the user.

In general, another aspect of the subject matter described in this specification can be embodied in methods that include the actions of storing data for each of a plurality of target videos, the data for each target video associating the target video with one or more clusters of co-watched videos for the target video, wherein each cluster is associated with one or more keywords; receiving a query and obtaining data identifying initial videos responsive to the query; selecting a cluster of co-watched videos for an initial target video selected from the initial videos responsive to the query, wherein the cluster of co-watched videos is selected according to how well the keywords associated with the cluster match the query; generating an augmented list of responsive videos, the augmented list including the initial videos and one or more of the co-watched videos in the selected cluster; and presenting the augmented list of videos in response to the query. Other embodiments of this aspect include corresponding systems, apparatus, and computer programs recorded on computer storage devices, each configured to perform the operations of the methods.

These and other embodiments can each optionally include one or more of the following features. The method can further include selecting a cluster of co-watched videos for each of a group of the initial target videos, wherein the augmented set of videos further includes one or more of the co-watched videos in each selected cluster. Each of the initial videos can have an associated result score and the group of the initial target videos can include all initial target videos whose result score satisfies a threshold. Each of the initial videos can have an associated result score and the group of the initial target videos includes a number of highest scored videos chosen from the initial videos.

Each cluster of co-watched videos can have an order. The method can further include ordering the co-watched videos in the augmented list of video search results in the same order the co-watched videos have in the cluster of co-watched videos. The search results for the co-watched videos can immediately follow the search result for the corresponding initial target video in the augmented list of video search results, without any intervening search results. Each cluster of co-watched videos can be ordered according to a video score for each video in the list, and the video score for each co-watched video can be derived from a quality score of the co-watched video and a co-watched score for the co-watched video and the target video. The method can further include determining that the number of initial search results does not satisfy a threshold.

Each co-watched video for a target video can have been viewed by a user within a time window of when the same user viewed the target video. Each co-watched video for a target video can have been viewed by a user after the user submitted a first search query, and the target video can have been viewed by the user after the user submitted a second search query, and the first search query can be similar to the second search query. One or more of the co-watched videos for a target video can have been selected by a user from a watch page on which the user viewed the target video. The time window can be defined by an amount of time. The time window can be defined by a number of videos viewed by the user.

In general, another aspect of the subject matter described in this specification can be embodied in methods that include the actions of storing data for each of a plurality of target videos, the data for each target video associating the target video with one or more clusters of co-watched videos for the target video; receiving a query and obtaining data identifying target videos responsive to the query, wherein the target videos are ranked according to a respective score for each target video, and wherein the target videos include a first target video having a first rank and a second target video having a second rank below the first rank; determining a score adjustment for the second target video according to a determination that the second target video is included in a cluster of co-watched videos for the first target video; and presenting the initial videos in an order according to the scores and score adjustments for the videos. Other embodiments of this aspect include corresponding systems, apparatus, and computer programs recorded on computer storage devices, each configured to perform the operations of the methods.

These and other embodiments can each optionally include one or more of the following features. Each co-watched cluster can be associated with one or more keywords. The method can further include selecting the cluster of co-watched videos for the first target video according to how well the keywords associated with the cluster match the query. The method can further include determining that the first target video has a result score that exceeds a threshold before determining a score adjustment for the second target video. The score adjustment for the second target video can be determined according to a co-watched score for the second target video and the first target video. The score adjustment can have an initial value if the co-watched score is below a first threshold and a capped value if the co-watched score is above a second threshold.

Each co-watched video for a target video can have been viewed by a user within a time window of when the same user viewed the target video. Each co-watched video for a target video can have been viewed by a user after the user submitted a first search query, and the target video was viewed by the user after the user submitted a second search query, and the first search query is similar to the second search query. One or more of the co-watched videos for a target video can have been selected by a user from a watch page on which the user viewed the target video. The time window can be defined by an amount of time. The time window can be defined by a number of videos viewed by the user.

Particular embodiments of the subject matter described in this specification can be implemented so as to realize one or more of the following advantages. Co-watched videos for a particular target video can be clustered by keywords associated with the videos. These clusters can be used to generate more diverse sets of related video suggestions for the target video. Keywords associated with the cluster can be used as a representation of the target video. These keywords can be used to trigger related content for a given video, including advertisements. The keywords can be used by classifiers to classify the videos. The clusters can also be used to increase the number of search results responsive to a given query, or to modify the ranking of search results responsive to the query.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
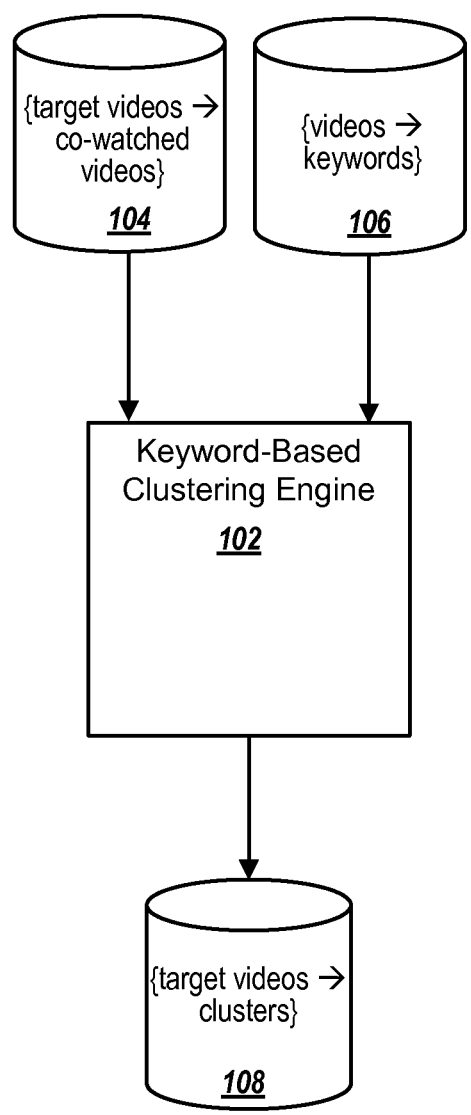
FIG. 1 illustrates an example keyword-based clustering engine.

FIG. 1 illustrates an example keyword-based clustering engine 102. The keyword-based clustering engine 102 receives data 104 associating target videos with co-watched videos and data 106 associating videos with keywords. The system processes this data to generate, for each target video, keyword-based clusters of co-watched videos for the target video.

The target videos to co-watched videos data 104 associates target videos with their co-watched videos. In general, a video is a co-watched video for a target video if a user watches the co-watched video within a time window of when the same user watches the target video. Examples of time windows are described below, with reference to FIG. 2. A user watches a video when the user causes the video to be played on his or her computer. Users can watch the co-watched video and then the target video, or can watch the target video and then the co-watched video. Additional criteria for determining when a video is a co-watched video can also be used, as described below with reference to FIGS. 2-3B. The target videos to co-watched videos data can be generated, for example, as described below with reference to FIG. 2.

In some implementations, the target videos to co-watched videos data 104 also includes a co-watched score for each co-watched video and target video. The co-watched score for a co-watched video and a target video is derived from the number of times users watched the co-watched video within the time window of when the users watched the target video. The co-watched score can be a weighted measure, where each time the video is watched is weighted by a factor derived from an amount of time, or a number of watched videos, between when the target video and the co-watched video were watched. The factor can be derived, for example, from a step function, a linear function, a logarithmic function, or some other function. The co-watched score for a co-watched video can also be weighted, for example, by an aggregate click-through-rate for the video, e.g., the number of times users selected the video divided by the number of times an option to select the video was presented to users.

The video to keywords data 106 associates each of the co-watched videos with keywords for the co-watched video. In some implementations, the keywords associated with the co-watched video are selected from metadata for the video. Metadata is information about the video that is associated with the video and can include, for example, one or more of a title of the video, a description of the video, and labels identifying the contents of the video. Metadata can be data included in a video file for the video, data that is separate from the video file for a video, or both.

In some implementations, the keywords associated with the co-watched video are derived from search logs. A search log can include entries associating a query with a video presented as a search result for the query and selected by a user. A user selects a video, for example, by clicking on the video, therefore causing the video to be played. Each search log entry can additionally include the length of time the user viewed the video after the video was selected. The keywords are derived from the search logs, for example, by selecting one or more search queries associated with the video in a search log entry. In some implementations, all search queries are associated with the video as keywords. In other implementations, fewer than all of the search queries are associated with the video as keywords. In these implementations, the search queries associated with the video as keywords can be, for example, a top number of queries most frequently associated with the video in the search log. In some of these implementations, the length of time the video was watched must exceed a threshold for the association to be counted. The threshold can be an absolute amount of time or a percentage of the length of the video.

Other techniques for associating keywords with videos can also be used, either in addition to, or as an alternative to, the techniques described above. For example, the keywords can be selected from anchor text from anchors that link to the video.

The keyword-based clustering engine 102 identifies the clusters for a given target video 108 by clustering the co-watched videos associated with the target video in the target-videos to co-watched videos data 104 according to the keywords associated with the co-watched videos in the data 106. The keyword-based clustering engine 102 can perform this clustering, for example, using conventional clustering techniques on the keywords.

In some implementations, the system first generates a pseudo-query from the keywords associated with each video, and then clusters videos based on the pseudo queries, for example, using conventional clustering techniques. Conventional techniques can be used to generate the pseudo-queries from the keywords. These conventional techniques can include, for example, stemming keywords and removing keywords that are stop words.

Other conventional keyword-based clustering techniques can alternatively be used in addition to pseudo-query clustering techniques.

In some implementations, the keyword-based clustering engine 102 ranks the co-watched videos in each target-specific cluster for a given target video relative to the other co-watched videos in the cluster. The keyword-based clustering engine 102 determines the ranks according to a video score for each video. The video score can be determined, for example, from the co-watched score for the co-watched video and the target video, a quality score for the co-watched video, or both.

The quality score is a query-independent measure of the quality of the co-watched video. For example, the quality score can be derived from a number of web pages, or number of web pages having a quality score above a threshold, that link to the video. Alternatively or additionally, the quality score can be derived from a number of times that users watched the video. The quality score can be received, for example, from a search engine or a video hosting system.

In some implementations, the keyword-based clustering engine 102 associates each cluster for a target video with the keywords used to generate the cluster. For example, if the clusters are generated according to pseudo-queries, the pseudo-query for each cluster can be associated with the cluster.

Figure 2:
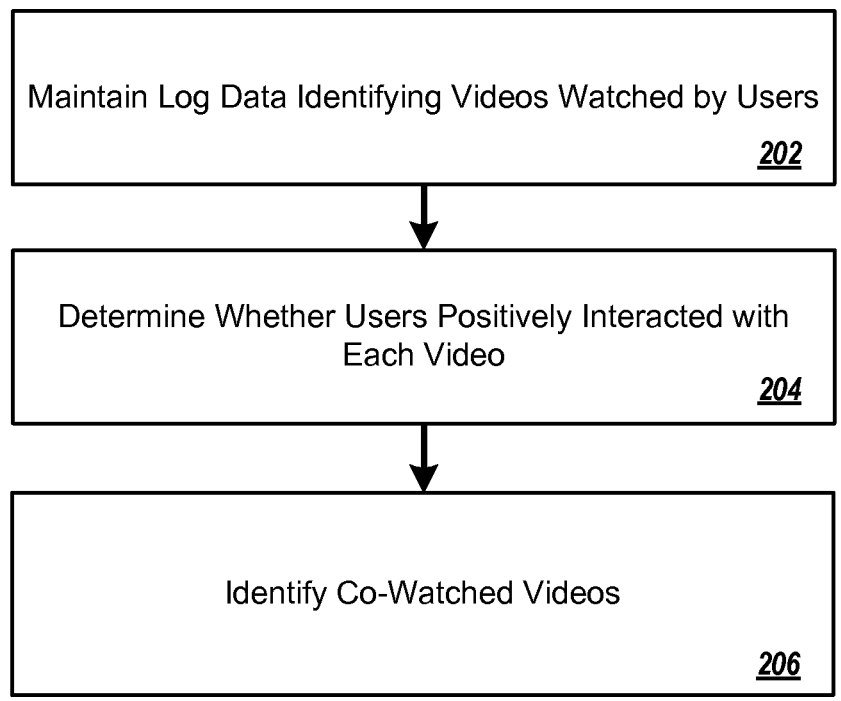
FIG. 2 illustrates an example technique for identifying co-watched videos.

FIG. 2 illustrates an example technique 200 for identifying co-watched videos. For convenience, the example technique 200 will be described in reference to a system that performs the technique 200. The system can be, for example, a video hosting system.

The system maintains log data identifying videos watched by a user (202). The log data is preferably anonymized for user privacy protection, for example, as described below. The log data is made up of records of individual user interactions with individual videos watched by users. User interactions can include, for example, using controls for video playback, e.g., play, pause, fast-forward, and rewind. User interactions can also include interactions with the video hosting system, e.g., entering a new search for videos or selecting a different video to watch.

Each record in the log data includes an identifier of the user, an identifier of the video, an identification of the interaction, a length of the interaction, and a time the interaction took place. The identifier of the user is preferably anonymized for privacy protection. For example, each user can be identified by an Internet protocol (IP) address of a corresponding user device used by the user, or can be identified according to a unique random number that is associated with the IP address of the user device. Thus, the user data is not associated with and does not identify a particular user. Other anonymization processes, such as hashing, encryption and obfuscation techniques, can also be used to ensure that user privacy is protected.

The system determines whether a user positively interacted with each video (204). In some implementations, merely watching any part of the video is considered a positive interaction. In other implementations, the system examines a user's individual interactions with the video to determine if the interactions are positive or negative. For example, if the user viewed the video for at least a threshold amount of time, the system can identify the viewing interaction as a positive interaction. The threshold can be an absolute amount of time or a percentage of the length of the video. The threshold can be determined, for example, empirically, to trade off between identifying too many, and too few, viewings as positive interactions. In some implementations, the threshold is the entire length of the video. Another signal the system can consider is whether the user rewound some or all of the video. Rewinding the video is a positive interaction because it indicates the user found some part of the video worth watching again. The system can compare the amount rewound to a threshold to determine if the rewinding signifies a positive interaction.

As another example, the system can determine whether the user rated the video. For example, if the user assigned a positive rating to the video, the user's interactions with the video can be identified as positive interactions.

The system can also identify various negative interactions, for example, viewing a video for less than a threshold amount of time or assigning a low rating to the video. Other negative interactions include, for example, performing another search or opening another web page, as both of these actions may indicate that the user was not satisfied with the video.

The system then determines whether the overall user interactions of a particular user with the video was positive or negative. For example, if the majority of the user interactions for a user and a video were positive, the system determines the overall user interaction for the user with the video was positive. Similarly, if the majority of the user interactions of the user with the video were negative, the system determines that the overall user interaction for the user with the video was negative.

The system identifies co-watched videos (206). The system first identifies co-watched videos for individual users, and then aggregates this data across all users.

To determine co-watched videos for individual users, the system sequences the videos watched by each user in time, according to when the user watched the video. Two videos are co-watched when a user's overall interactions with both videos during a window of time were positive. The window of time can be defined, for example, by an amount of time or a number of videos.

In some implementations, the window of time is a predetermined window of time, for example, that is determined empirically, for example, according to estimates of how long users tend to browse videos on the same topic. In other implementations, the window of time is a dynamic window of time that can vary based on various factors including user activity level and whether a user performs a search during a viewing session. For example, the window of time can be shorter when a user activity level is high, e.g., when the user views videos in rapid succession. As another example, the time window can be determined so that it never spans a user search. For example, if a user views video A, enters a search query, and enters video b, the time window should not include both videos A and B. As yet another example, the time window can be determined so that it only spans similar user searches. For example, if a user searched for a query, viewed video A, then entered a similar query, and viewed video B, the time window could be defined to include both video A and video B. Two queries are similar, for example, when they differ in the use of synonyms, stop words, or small spelling differences. For example, the system can apply conventional stemming, normalization, and stop word removal techniques to both queries. After that is done, if the resulting queries have more than a threshold number of words in common, the system can determine that the two queries are similar. In some implementations, the threshold is 100%. Other thresholds can also be used.

In some implementations, the system only identifies videos as being co-watched when they were watched within a time window of each other and under specific circumstances. For example, the system might require that the videos be selected from a video search results page after the same search, or after similar queries. Alternatively, the system might require that a co-watched video be selected from a watch page for a target video. In some implementations, the system requires that either the videos be selected from a video search results page after the same or similar searches or that the co-watched video be selected from a watch page for a target video. An example of videos selected from a video search results page after the same or similar searches and an example of a video selected from a watch page are described below, with reference to FIGS. 3A and 3B.

Once the system determines the co-watched videos for individual users, the system aggregates the data to generate the target video to co-watched video data 104 described above with reference to FIG. 1. The system can determine a number of times a given video is co-watched with a given target video. Sometimes the co-watched association is two way, for example, if video A is co-watched for video B, then video B is co-watched for video A. Sometimes, the co-watched association is one way, for example, video A is co-watched for video B, but video B is not co-watched for video A. For example, this one way association can be used when a video A is viewed from the watch page for video B, as described below with reference to FIG. 3B. In some implementations, the association is one way when video A has a number of co-watched videos satisfying a threshold, and otherwise is two way.

In some implementations, the system only associates a co-watched video with a target video when the co-watched score for the co-watched video and the target video satisfies, e.g., exceeds, a threshold. The system can determine a co-watched score for a given target video and co-watched video according to the number of times the co-watched video was identified as a co-watched video for the target video, as described above with reference to FIG. 1.

Figure 3A:
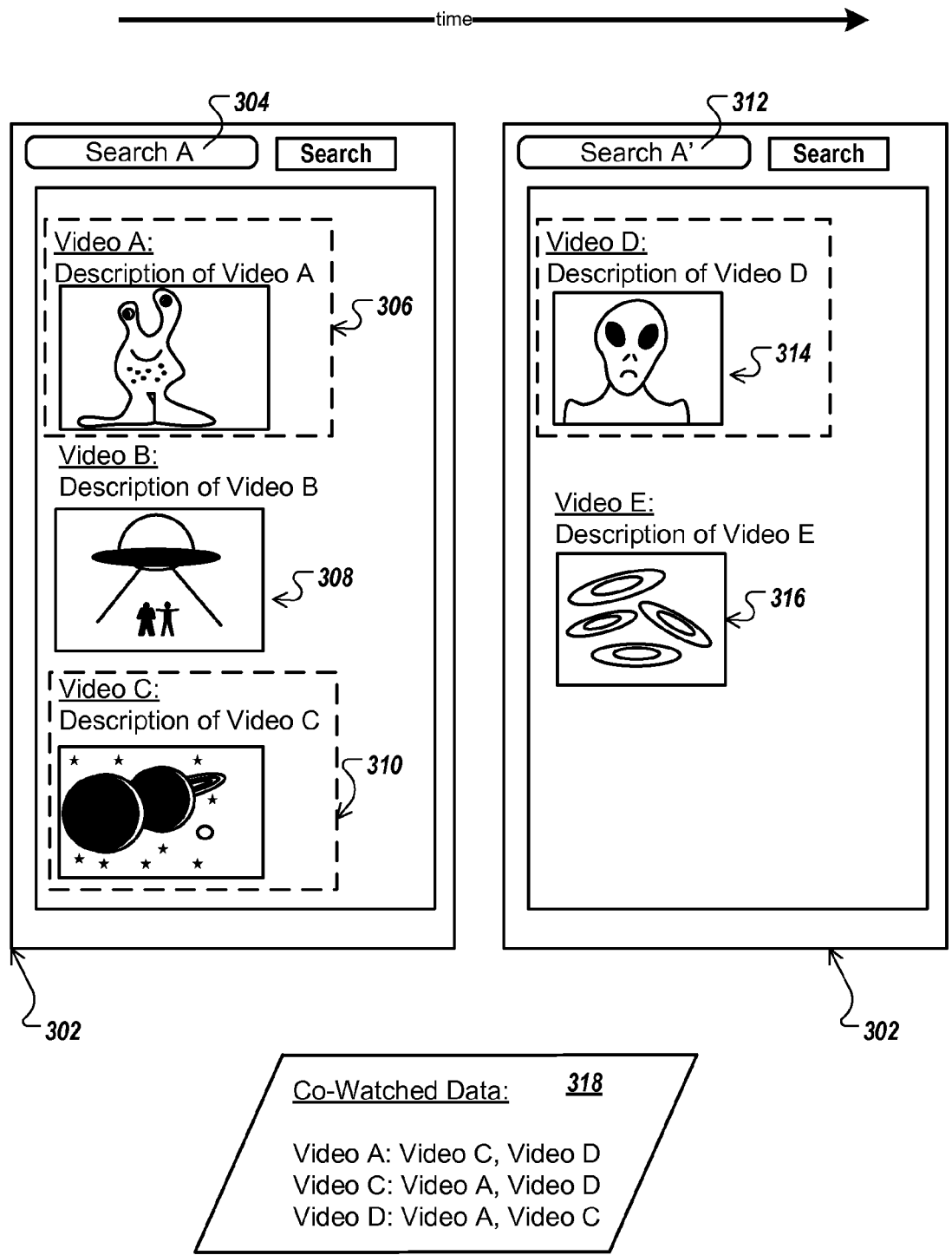
FIG. 3A illustrates user interactions with video search results over time, and the resulting co-watched video data.

FIG. 3A illustrates user interactions with video search results over time, and the resulting co-watched video data.

The user first views search results in a video search user interface 302 that are responsive to the search query "Search A" 304. The video search user interface 302 displays video search results 306, 308, and 310 that are responsive to the query 304.

The user selects, e.g., clicks on, video search results responsive to the query and is taken to video watch pages for each selected video. The user can watch each video from its video watch page. In FIG. 3A, the user selects the search result 306 for video A, watches video A, and then returns to the search result page, selects the search result 310 for video C, and then watches video C.

The user then submits a second query 312 in the search user interface 302. This second query is for "Search A'." The user is presented with search results 314 and 316, and selects search result 314 for Video D.

Co-watched data 318 is generated from these user interactions. For example, the user watched video A and video C after the same query "Search A" 304. Therefore, the co-watched data associates videos A and C. The user watched video D after submitting the search query "Search A'" 312. Although the queries 304 and 312 are not identical, they are sufficiently similar, for example, according to the standards described above with reference to FIG. 1, to relate video D to videos A and C as co-watched videos. This association is also reflected in the co-watched data.

Figure 3B:
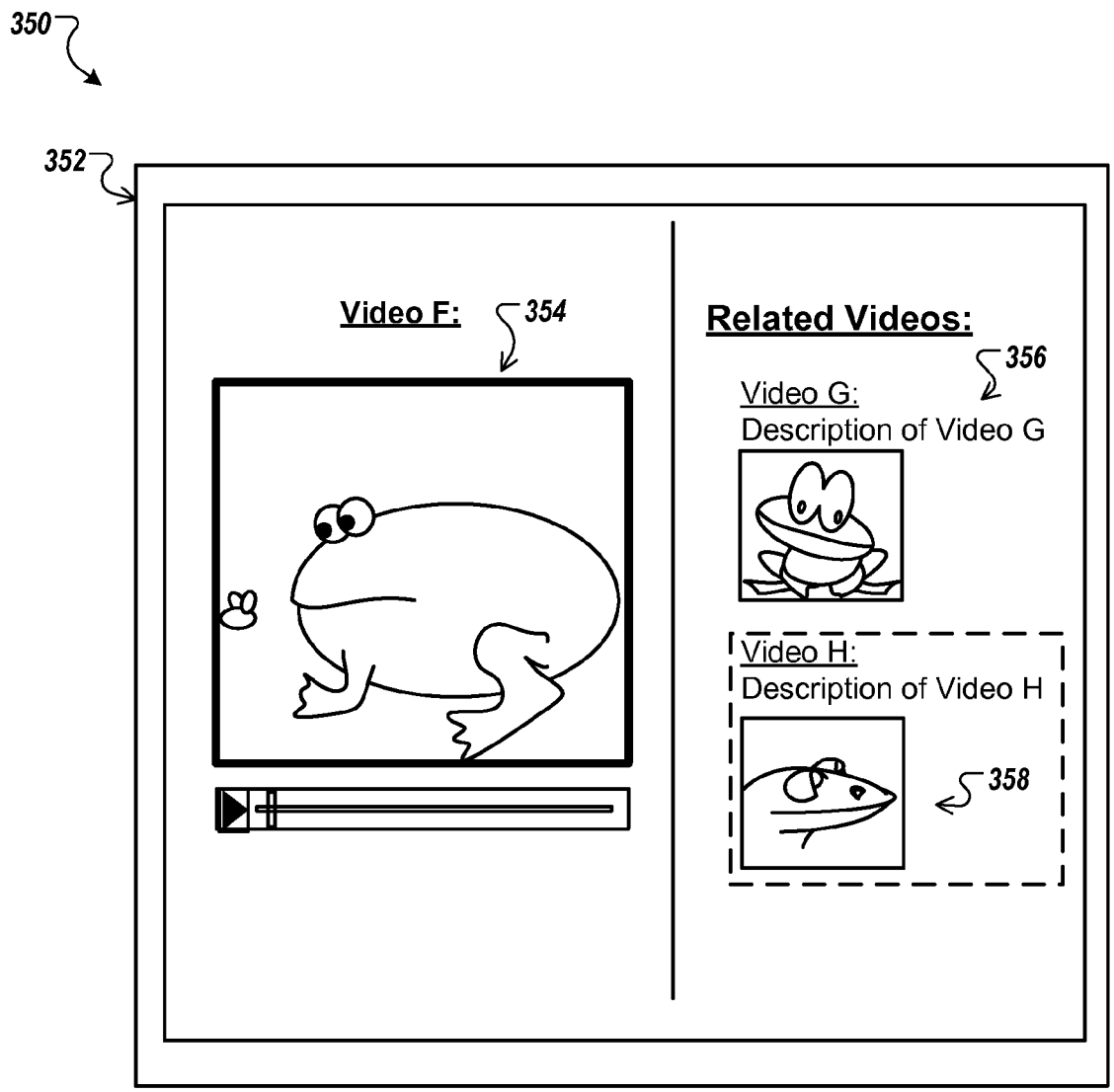
FIG. 3B illustrates an example watch page user interface displaying a video.
Figure 3B:
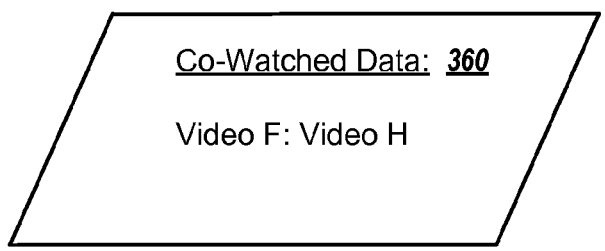

FIG. 3B illustrates an example watch page user interface 352 displaying video F 354. The watch page includes video F 354 and also includes representations of related videos 356 for video F 354. The representations of the related videos 356 are presented as selectable user interface elements. The selectable user interface elements include a title of the video (e.g., "Video G"), a description of the video (e.g., "Description of Video G"), and an image representing the video, for example, a frame from the video. Other selectable user interface elements can alternatively be used. A user can view one of the related videos by selecting the selectable user interface element corresponding to the video.

For example, in FIG. 3B, a user selects video H 358. The co-watched video data 360 therefore indicates that video H is a co-watched video for video F. Because video H was watched from a watch page of video F, the association is a one-way association. Therefore video F is not a co-watched video for video H.

Figure 4:
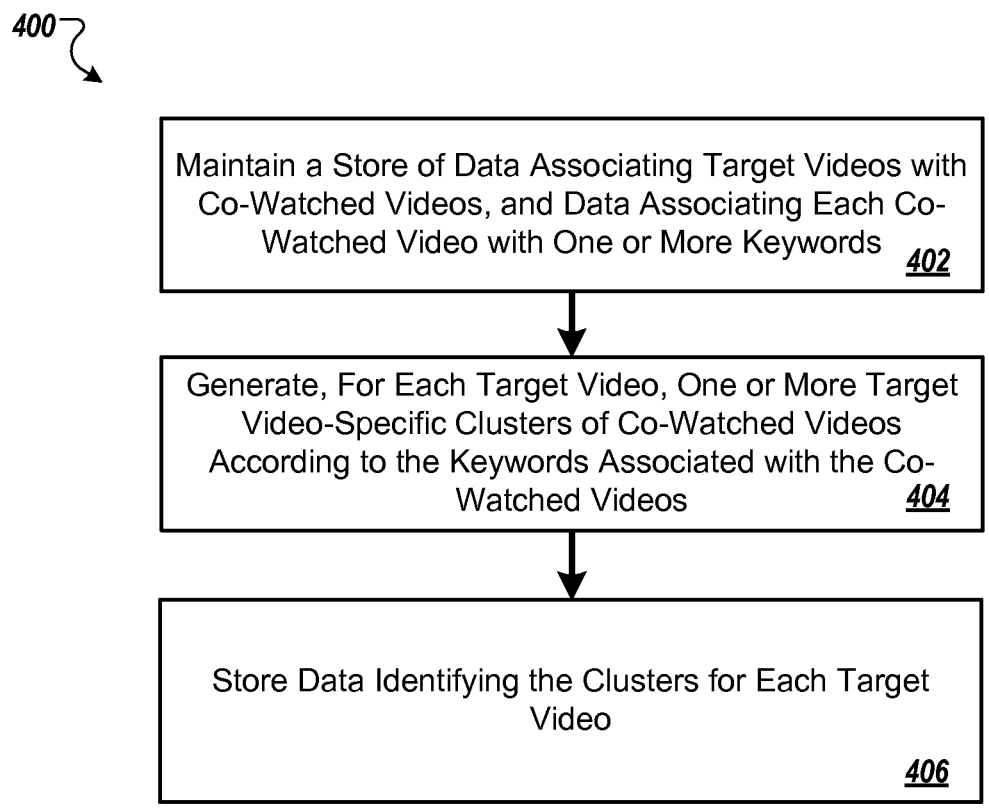
FIG. 4 illustrates an example technique for generating target-video specific clusters of co-watched videos.

FIG. 4 illustrates an example technique 400 for generating target-video specific clusters of co-watched videos. For convenience, the example technique 400 will be described in reference to a system that performs the technique 400. The system can be, for example, the keyword-based clustering engine 102.

The system maintains a store of data associating target videos with co-watched videos, and data associating each co-watched video with one or more keywords (402). This data is described in more detail above with reference to FIGS. 1-3.

The system generates, for each target video, one or more target video-specific clusters of co-watched videos (404). The clusters are generated according to keywords associated with the co-watched videos. For example, the system can generate the clusters as described above with reference to FIG. 1.

The system stores data identifying the clusters for each target video (406). The data indexes the clusters for each target video according to the target video.

Once generated, the clusters for each target video can be used in various applications, some examples of which are given below.

Figure 5:
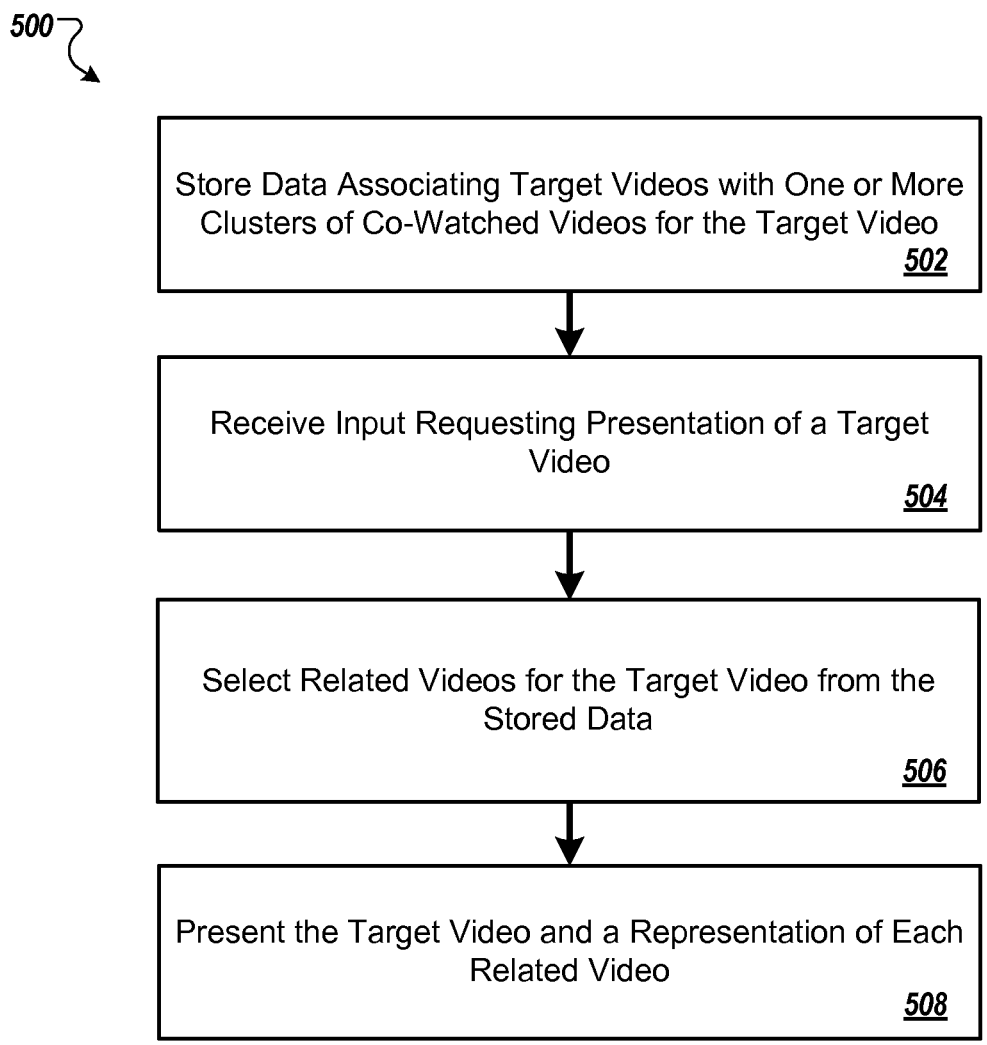
FIG. 5 illustrates an example technique for using clusters of co-watched videos to identify diverse related videos for a target video.

FIG. 5 illustrates an example technique 500 for using clusters of co-watched videos to identify diverse related videos for a target video. For convenience, the example technique 500 will be described in reference to a system that performs the technique 500. The system can be, for example, a video hosting system.

The system stores data associating target videos with one or more clusters of co-watched videos for the target video (502). The data can be generated, for example, as described above with reference to FIGS. 1-4.

The system receives input requesting presentation of a target video (504). The input is received, for example, when a user requests that a watch page for the target video be presented. The user can make this request by entering a URL associated with a watch page for the target video, or by selecting a selectable user interface element to indicate that the watch page for the target video should be displayed. The selectable user interface element can be a search result or a related video representation, for example, as described above with reference to FIGS. 3A and 3B.

The system selects related videos for the target video from the stored data (506). The system makes this selection by selecting two or more of the clusters for the first target video from the stored data, and then selecting a co-watched video from each selected cluster.

In some implementations, the system identifies each cluster for the first target video as being on-topic or off-topic. Off-topic clusters are clusters that are only tangentially related to the first target video. In some implementations, off-topic clusters are determined according to a cluster score for each cluster. The cluster score is derived from a co-watched score for each video in the cluster and the target video. The co-watched score for a co-watched video and a target video is described above with reference to FIG. 1. The cluster score for a cluster can be determined, for example, by summing, averaging, or otherwise combining the co-watched scores for the co-watched videos in the cluster. If the cluster score of a cluster fails to satisfy a threshold, the cluster is an off-topic cluster. In some implementations, the threshold is a pre-determined value determined, for example, empirically, to trade off between identifying too many clusters as off-topic clusters and identifying too few clusters as off-topic clusters. In other implementations, the threshold is determined relative to the cluster scores for the clusters associated with the first target video. For example, the threshold can be the median cluster score of the clusters.

In some implementations, the system selects the co-watched video from each cluster that has a highest video score of each video in the cluster. The video score for a co-watched video can be derived, for example, as described above with reference to FIG. 1, from the co-watched score for the co-watched video and the target video, a quality score of the target video, or both. In other implementations, the system selects a co-watched video at random from each cluster. In some implementations, the system selects more than one co-watched video from each cluster.

The system presents the target video and a representation of each related video (508). The system presents the target video and the representation of each related video, for example, by generating a watch page from which a user can play the target video and select from among the related videos. An example watch page is described above with reference to FIG. 3B.

The representation of each related video can be a selectable user interface element on a graphical user interface. For example, the selectable user interface element can include a hyperlink in the watch page. The representation can optionally include details about the related video, for example, the title of the video, the description of the video, or a frame from the video, for example, as described above with reference to FIG. 3B.

Figure 6:
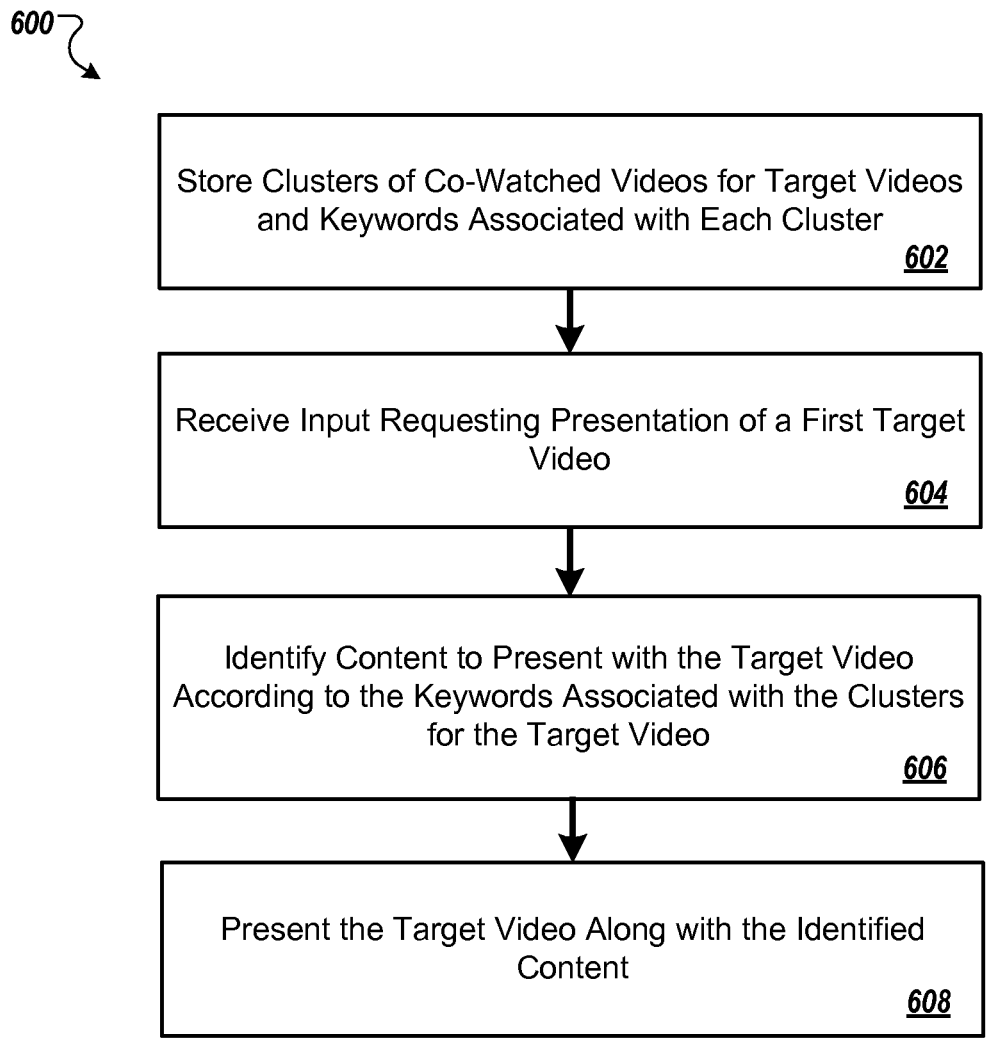
FIG. 6 illustrates an example technique for using keywords associated with clusters of co-watched videos for a given target video to identify content to present along with the target video.

FIG. 6 illustrates an example technique 600 for using keywords associated with clusters of co-watched videos for a given target video to identify content to present along with the target video. For convenience, the example technique 600 will be described in reference to a system that performs the technique 600. The system can be, for example, a video hosting system.

The system stores clusters of co-watched videos for target videos and keywords associated with each cluster (602). The system associates the clusters with their respective target videos. The clusters and keywords can be generated, for example, as described above with reference to FIGS. 1-4.

The system receives input requesting presentation of a first target video (604). The input can be received, for example, as described above with reference to FIG. 5.

The system identifies content to present with the target video according to the keywords associated with the clusters of co-watched videos for the target video (606). To aid in this identification, the system stores data associating keywords with content. The content can be, for example, advertisements, videos, images, or multimedia content. The system identifies the content by matching the keywords from the clusters of co-watched videos for the target video to keywords associated with a particular piece of content, and then identifying the particular content. The system can use conventional techniques for performing this matching. When keywords for the clusters match multiple pieces of content, the system can select one of the matching pieces of content, for example, using conventional techniques.

In some implementations, the system uses keywords associated with only some of the clusters of co-watched videos for the target video. For example, the system can calculate a cluster score for each of the clusters, as described above with reference to FIG. 5, and use only keywords associated with clusters whose cluster scores satisfy a threshold, or a number of top-scoring clusters. In some implementations, the system identifies one or more of the clusters as off-topic clusters and does not use the keywords associated with the off-topic clusters. The system can identify an off-topic cluster, for example, as described above with reference to FIG. 5.

The system presents the target video along with the identified content (608). The system presents the target video and the identified content, for example, by generating a watch page where a user can play the target video and view and optionally interact with the content.

Figure 7:
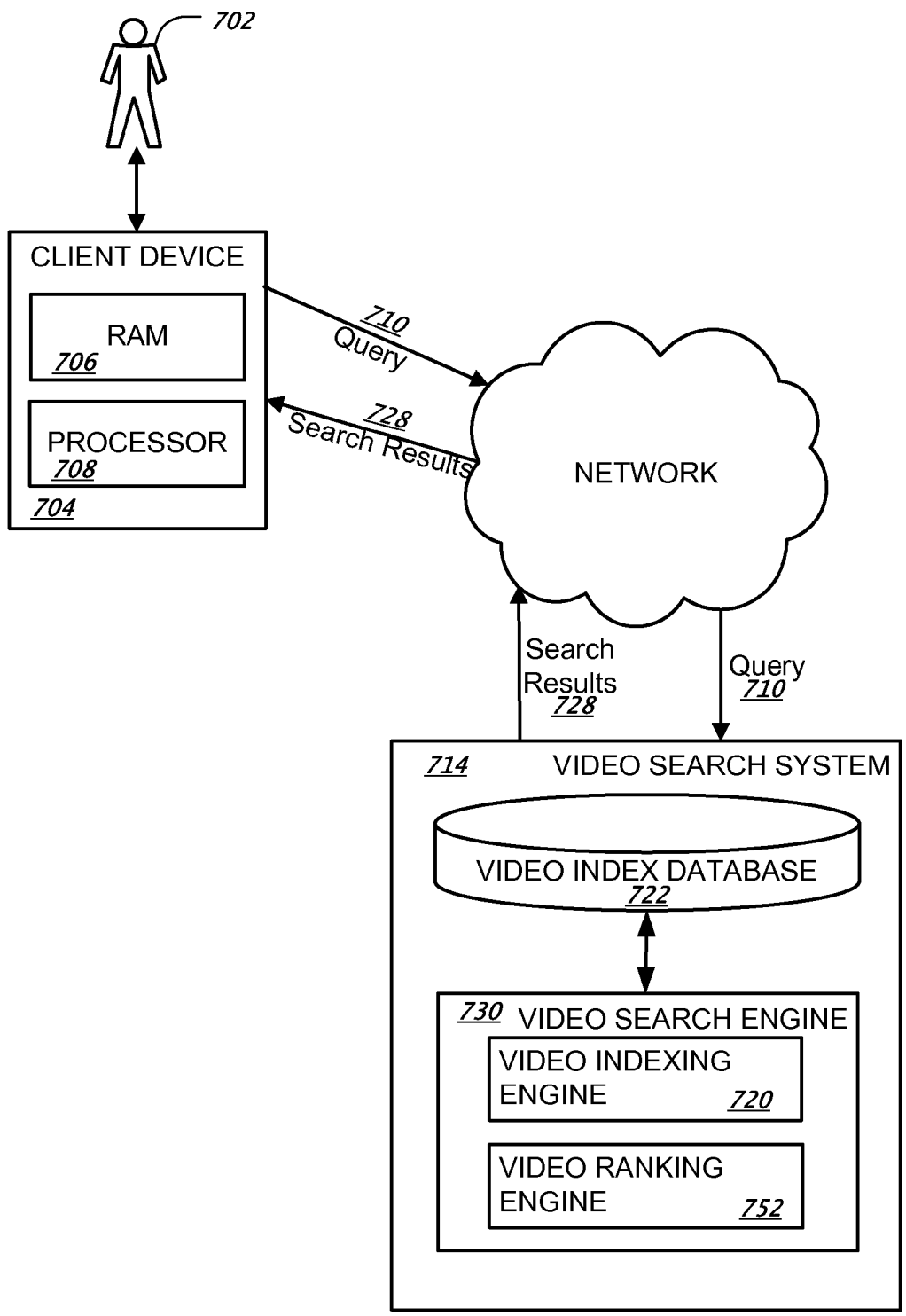
FIG. 7 illustrates an example video search system for providing search results relevant to submitted queries.

FIG. 7 illustrates an example video search system 714 for providing search results, e.g., videos, relevant to submitted queries as can be implemented in an Internet, an intranet, or other client and server environment. The video search system 714 is an example information retrieval system.

A user 702 interacts with the video search system 714 through a client device 704. For example, the client device 704 can be or include a computer (e.g., a personal computer, a mobile phone, etc.) coupled to the search system 714 through a wired or wireless local area network (LAN) or wide area network (WAN), e.g., the Internet. In some implementations, the video search system 714 and the client device 704 are both implemented in the same machine. For example, a user can install a desktop search application on the client device 704. The client device 704 will generally include a random access memory (RAM) 706 and a processor 708.

A user 702 submits a query 710 to a video search engine 730 within the video search system 714. When the user 702 submits a query 710, the query 710 is transmitted through a network to the search system 714. The video search system 714 can be implemented as, for example, computer programs running on one or more computers in one or more locations that are coupled to each other through a network. In some implementations, the video search system 714 includes an video index database 722 and a video search engine 730. The video search system 714 responds to the query 710 by generating search results 728, which are transmitted through the network to the client device 704 in a form that can be presented to the user 702 (e.g., in a search results web page to be displayed in a web browser running on the client device 704). For example, the search results can include videos responsive to the user query.

When the query 710 is received by the video search engine 730, the video search engine 730 identifies videos that match the query 710. The video search engine 730 will generally include a video indexing engine 720 that indexes videos found by the search system 714, for example, documents found while crawling the Internet, a video index database 722 that stores the index information, and a ranking engine 752 (or other software) to rank the videos that match the query 710, for example, according to a result score associated with each video by the video search engine 730. The result score can be a query-independent measure of the quality of the video, a query-specific measure of how well the video matches the query, or a score derived from both a query-independent measure and a query specific measure. The search engine 730 transmits the search results 728 through the network to the client device 704 for presentation to the user 702.

Figure 8:
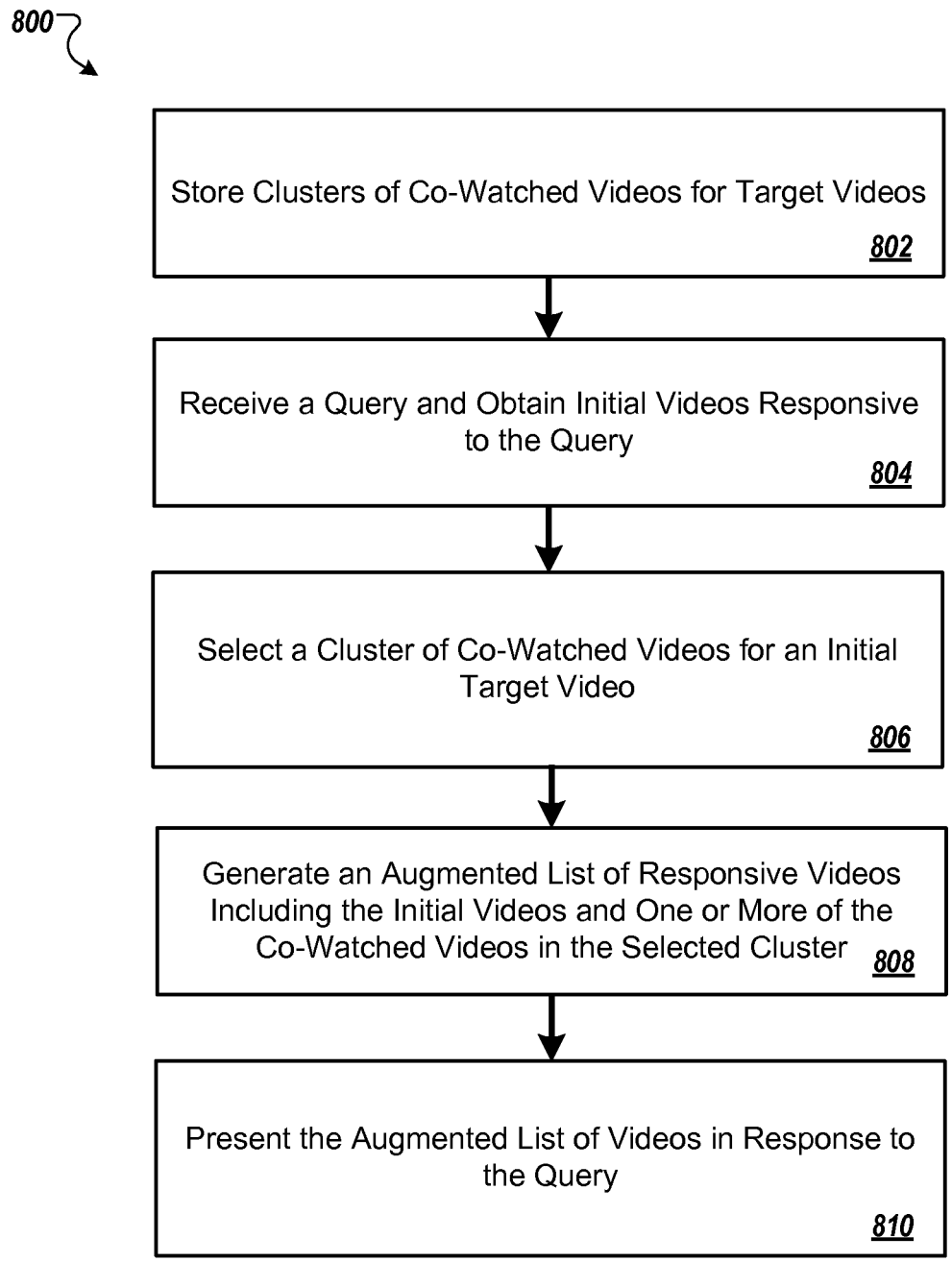
FIG. 8 illustrates an example technique for using clusters of co-watched videos to generate an augmented list of search results responsive to a query.

FIG. 8 illustrates an example technique 800 for using clusters of co-watched videos to generate an augmented list of search results responsive to a query. For convenience, the example technique 800 will be described in reference to a system that performs the technique 800. The system can be, for example, the search system 714 described above with reference to FIG. 7.

The system stores clusters of co-watched videos for target videos (802). The data can be generated, for example, as described above with reference to FIGS. 1-4. The data further associates each cluster with one or more keywords. These keywords can be, for example, the keywords associated with the clusters as described above with reference to FIG. 1.

The system receives a query and obtains initial videos responsive to the query (804). The query and initial videos can be obtained through a search system, for example, as described above with reference to FIG. 7.

The system selects a cluster of co-watched videos for an initial target video (806). The cluster is selected according to how well the keywords associated with the cluster match the query. The system selects the cluster for the initial target video whose keywords best match the query. In some implementations, the system provides the keywords and the query to a match engine that generates a match score representing the quality of the match between the keywords and the query. The system can then select the cluster whose keywords have the best match score. The quality of the match can be measured according to various techniques including string comparison techniques such as edit distance. In some implementations, normalizations and synonym substitutions are also applied to the keywords and the query to determine the quality of the match.

In some implementations, the match score for the best matching cluster must additionally satisfy a threshold in order for the cluster to be selected. The threshold can be determined, for example, empirically, based on an analysis of match scores of various clusters.

The system generates an augmented list of responsive videos including the initial videos and one or more of the co-watched videos in the selected cluster (808).

In some implementations, the co-watched videos in each cluster for the target video are ordered. For example, the co-watched videos in a cluster can be ordered according to a video score derived from a co-watched score for the target video and each co-watched video, a quality score for each co-watched video, or both, as described above with reference to FIG. 1. In these implementations, the one or more co-watched videos selected from a cluster can be, for example, the top scoring videos. Alternatively, the one or more co-watched videos can be selected at random from the cluster.

In some implementations, when the system adds the co-watched videos from a cluster to the augmented list of videos, the system maintains the order the co-watched videos had in the cluster. In some implementations, the co-watched videos for a given initial video appear immediately after the initial video in the augmented list of videos. For example, if video A is associated with a cluster of videos including video B, video C, and video D, ranked in that order, then the augmented list would include video A, video B, video C, and video D, in that order.

In some implementations, the system identifies a group of multiple initial videos responsive to the query. The system selects a cluster of co-watched videos for each of the group of initial videos for inclusion in the augmented list of responsive videos. In these implementations, the augmented list of videos further includes one or more videos from each selected cluster.

When the initial videos have associated result scores or ranks, e.g., determined by the search engine that identified the initial videos, the system can select the group of multiple initial videos according to the result scores or ranks of the initial videos. For example, the system can select all initial videos whose result score satisfies a threshold. As another example, the system can identify a number of top-scoring initial videos, e.g., a number of top-ranked initial videos.

The system presents the augmented list of videos in response to the query (810). For example, the system can send the augmented list of videos to a user device for presentation to a user, as described above with reference to FIG. 7. The videos can be presented in a search results page, for example, as described above with reference to FIG. 3A.

Figure 9:
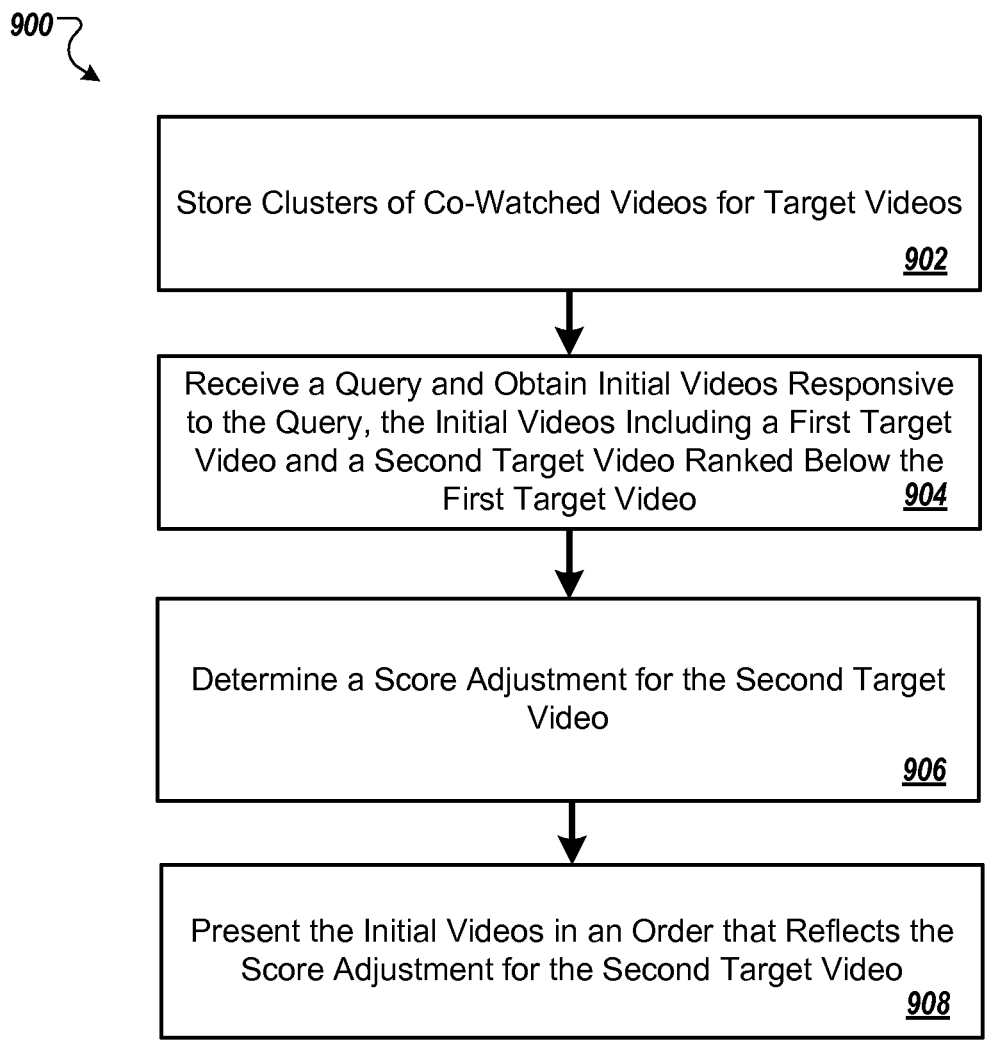
FIG. 9 illustrates an example technique for using clusters of co-watched videos to re-order a list of search results responsive to a query.

FIG. 9 illustrates an example technique 900 for using clusters of co-watched videos to re-order search results responsive to a query. For convenience, the example technique 900 will be described in reference to a system that performs the technique 900. The system can be, for example, the search system 714 described above with reference to FIG. 7.

The technique described in FIG. 9 promotes videos that are in co-watched clusters for higher-ranked videos. The intuition is that if a first video is highly ranked, and users often watch the first video with the second video, then the second video should have its rank increased.

The system stores clusters of co-watched videos for target videos (902). The clusters can be generated, for example, as described above with reference to FIGS. 1-4.

The system receives a query and obtains data identifying initial videos responsive to the query (904). Each initial video has a result score, and the initial videos are ranked according to their result scores. The result scores can be determined by a search engine. The initial videos include a first target video and a second target video ranked below the first target video, i.e., a second target video having a result score lower than the result score of the first target video. The query and initial videos can be obtained through a search system, for example, as described above with reference to FIG. 7.

The system determines a score adjustment for the second target video (906). The system determines the score adjustment for the second target video according to a determination that the second target video is included in a cluster of co-watched videos for the first target video.

The value of the score adjustment is determined according to a co-watched score for the second target video and the first target video. The score adjustment can also be determined according to additional factors, for example, a result score assigned to the first target video by a search engine. In some implementations, the score adjustment is capped on either the lower or the upper end. For example, the score adjustment can always have an initial value if the co-watched score is less than a first threshold, or can always have a capped value if the co-watched score is greater than a second threshold.

In some implementations, each cluster of co-watched videos for the first target video is associated with one or more keywords, for example, as described above with reference to FIG. 1. In these implementations, the system can select the cluster of co-watched videos for the first target video according to how well the keywords for the cluster match the query, for example, as described above with reference to FIG. 8.

In some implementations, the system determines that the first target video has a result score that satisfies a threshold, or a rank that satisfies a threshold, before the system determines the score adjustment. The result score or rank can be determined, for example, by a search engine as described above with reference to FIG. 7. The threshold can be determined, for example, empirically, based on an analysis of result scores or ranks of search results and an empirical estimate of how good those search results are. The empirical estimate can be determined from human evaluation, or based on data collected for the search results, for example, a click through rate for the search result and a query.

The system presents the initial videos in an order that reflects the score adjustment for the second target video (908). For example, the system can determine an adjusted score for the second target video by applying the score adjustment to the result score for the video and then re-ranking the videos according to the result scores and adjusted scores. Applying the score adjustment to the result score can include, for example, multiplying the result score by the score adjustment or adding the score adjustment to the score. The results can be presented, for example, as described above with reference to FIG. 8.

In some implementations, the system determine score adjustments for multiple videos as described above, applies the score adjustments to the result scores for each of the multiple videos to determine adjusted scores for the videos, and then re-ranks the videos according to the adjusted scores.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, while the foregoing discussion describes clustering co-watched videos, similar techniques can be applied to clustering other types of content including, for example, audio files, documents, images, and multimedia presentations. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
   one or more computers programmed to perform operations comprising:
   for each of a plurality of target videos, wherein each target video was viewed by a user in response to a particular query submitted by the user, identifying a respective plurality of co-watched videos, wherein each respective co-watched video for the target video was viewed by a respective user within a time window of when the same user viewed the target video;
   identifying a respective first query for each respective co-watched video wherein the respective co-watched video was selected by users more often when identified in a search result responsive to the respective first query in a plurality of queries submitted by users than when identified in search results responsive to other queries in the plurality of queries submitted by users, and wherein the selections responsive to the plurality of queries are counted only when the length of time the video was watched exceeds a threshold time, and wherein the first respective query for the respective co-watched video is different from the particular query of the target video for which the respective co-watched video was identified;
   deriving, from each respective first query for each respective co-watched video, one or more respective keywords to be associated with the respective co-watched video;
   for each target video in the plurality of target videos, using the one or more respective keywords for each co-watched video to generate one or more target video-specific clusters of co-watched videos for the target video, and wherein a first video from each target video-specific cluster is a co-watched video for the target video, the co-watched video for the target video having first keywords including the respective first query, the first keywords being in common with second keywords from at least one second video from the cluster, the first keywords being different from the particular query; and
   storing data identifying the clusters for each target video, wherein the data indexes the clusters for each target video according to the corresponding target video.

2. The system of claim 1, further operable to perform operations comprising selecting content related to a first target video according to the clusters for the first target video.

3. The system of claim 2, wherein the content is a first co-watched video selected from one of the clusters for the first target video.

4. The system of claim 1, further operable to perform operations comprising selecting a plurality of related videos for a first target video, the selecting comprising:
  identifying the clusters for the first target video from the stored data; and
  selecting a co-watched video from each of the clusters.

5. The system of claim 1, further operable to perform operations comprising, for each target video in the plurality of target videos:
  determining a score for each cluster generated for the target video; and
  identifying one or more clusters as being off-topic for the target video according to the scores.

6. The system of claim 1, wherein each co-watched cluster is associated with one or more keywords of the respective co-watched videos that belong to the cluster, the system further operable to perform operations comprising:
  receiving input requesting presentation of a first target video;
  identifying content to present with the first target video according to one or more of the keywords associated with the clusters for the first target video; and
  providing the first target video along with the content.

7. The system of claim 6, further operable to perform operations comprising:
  receiving data identifying a set of initial videos responsive to a query;
  selecting a cluster of co-watched videos for an initial target video selected from the initial videos, wherein the cluster of co-watched videos is selected according to how well the keywords associated with the cluster match the query; and
  providing one or more of the initial videos and one or more of the co-watched videos from the selected cluster in response to the query.

8. The system of claim 1, further operable to perform operations comprising:
  receiving data identifying a set of target videos responsive to a query, wherein the target videos are ordered according to a respective result score for each target video, and wherein the target videos include a first target video having a first rank and a second target video having a second rank below the first rank;
  determining that the second target video is in a cluster of co-watched videos for the first target video; and
  providing the target videos in a different order according to a score adjustment for the second target video.

9. The system of claim 1, wherein each of one or more co-watched videos for the respective target video was viewed by a user after the user submitted a first search query, and the respective target video was viewed by the user after the user submitted a second search query, and the first search query is similar to the second search query.

10. The system of claim 1, wherein one or more of the co-watched videos for the respective target video were selected by a user from a watch page on which the user viewed the respective target video.

11. The system of claim 1, wherein the time window is defined by an amount of time.

12. The system of claim 1, wherein the time window is defined by a number of videos viewed by the user.

13. A method implemented by data processing apparatus, the method comprising:
  for each of a plurality of target videos, wherein each target video was viewed by a user in response to a particular query submitted by the user, identifying a respective plurality of co-watched videos, wherein each respective co-watched video for the target video was viewed by a respective user within a time window of when the same user viewed the target video;
  identifying a respective first query for each respective co-watched video wherein the respective co-watched video was selected by users more often when identified in a search result responsive to the respective first query in a plurality of queries submitted by users than when identified in search results responsive to other queries in the plurality of queries submitted by users, and wherein the selections responsive to the plurality of queries are counted only when the length of time the video was watched exceeds a threshold time, and wherein the first respective query for the respective co-watched video is different from the particular query of the target video for which the respective co-watched video was identified;
  deriving, from each respective first query for each respective co-watched video, one or more respective keywords to be associated with the respective co-watched video;
  for each target video in the plurality of target videos, using the one or more respective keywords for each respective co-watched video to generate one or more target video-specific clusters of co-watched videos for the target video, wherein a first video from each target video-specific cluster is a co-watched video for the target video, the co-watched video for the target video having first keywords including the respective first query, the first keywords being in common with second keywords from at least one second video from the cluster, the first keywords being different from the particular query; and
  storing data identifying the clusters for each target video, wherein the data indexes the clusters for each target video according to the corresponding target video.

14. The method of claim 13, further comprising selecting content related to a first target video according to the clusters for the first target video.

15. The method of claim 14 wherein the content is a first co-watched video selected from one of the clusters for the first target video.

16. The method of claim 13, further comprising selecting a plurality of related videos for a first target video, the selecting comprising:
  identifying the clusters for the first target video from the stored data; and
  selecting a co-watched video from each of the clusters.

17. The method of claim 13, further comprising, for each target video in the plurality of target videos:
  determining a score for each cluster generated for the target video; and
  identifying one or more clusters as being off-topic for the target video according to the scores.

18. The method of claim 13 wherein each co-watched cluster is associated with one or more keywords of the respective co-watched videos that belong to the cluster, the method further comprising:
  receiving input requesting presentation of a first target video;
  identifying content to present with the first target video according to one or more of the keywords associated with the clusters for the first target video; and
  providing the first target video along with the content.

19. The method of claim 18, further comprising:
  receiving data identifying a set of initial videos responsive to a query;
  selecting a cluster of co-watched videos for an initial target video selected from the initial videos, wherein the cluster of co-watched videos is selected according to how well the keywords associated with the cluster match the query; and providing one or more of the initial videos and one or more of the co-watched videos from the selected cluster in response to the query.

20. The method of claim 13, further comprising:

receiving data identifying a set of target videos responsive to a query, wherein the target videos are ordered according to a respective result score for each target video, and wherein the target videos include a first target video having a first rank and a second target video having a second rank below the first rank;

determining that the second target video is in a cluster of co-watched videos for the first target video; and providing the target videos in a different order according to a score adjustment for the second target video.

21. The method of claim 13, wherein each of one or more co-watched videos for the respective target video was viewed by a user after the user submitted a first search query, and the respective target video was viewed by the user after the user submitted a second search query, and the first search query is similar to the second search query.

22. The method of claim 13, wherein one or more of the co-watched videos for the respective target video were selected by a user from a watch page on which the user viewed the respective target video.

23. The method of claim 13, wherein the time window is defined by an amount of time.

24. The method of claim 13, wherein the time window is defined by a number of videos viewed by the user.

25. A non-transitory computer storage medium having instructions stored thereon that, when executed by data processing apparatus, cause the data processing apparatus to perform operations comprising:

for each of a plurality of target videos, wherein each target video was viewed by a user in response to a particular query submitted by the user, identifying a respective plurality of co-watched videos, wherein each respective co-watched video for the target video was viewed by a respective user within a time window of when the same user viewed the target video;

identifying a respective first query for each respective co-watched video wherein the respective co-watched video was selected by users more often when identified in a search result responsive to the respective first query in a plurality of queries submitted by users than when identified in search results responsive to other queries in the plurality of queries submitted by users, and wherein the selections responsive to the plurality of queries are counted only when the length of time the video was watched exceeds a threshold time, and wherein the respective first query for the respective co-watched video is different from the particular query of the target video for which the respective co-watched video was identified;

deriving, from each respective first query for each respective co-watched video, one or more respective keywords to be associated with the respective co-watched video, for each target video in the plurality of target videos, using the one or more respective keywords for each respective co-watched video to generate one or more target video-specific clusters of co-watched videos for the target video, wherein a first video from each target video-specific cluster is a co-watched video for the target video, the co-watched video for the target video having first keywords including the respective first query, the first keywords being in common with second keywords from at least one second video from the cluster, the first keywords being different from the particular query; and storing data identifying the clusters for each target video, wherein the data indexes the clusters for each target video according to the corresponding target video.

26. The computer storage medium of claim 25, further operable to perform operations comprising selecting content related to a first target video according to the clusters for the first target video.

27. The computer storage medium of claim 26, wherein the content is a first co-watched video selected from one of the clusters for the first target video.

28. The computer storage medium of claim 25, further operable to perform operations comprising selecting a plurality of related videos for a first target video, the selecting comprising:

identifying the clusters for the first target video from the stored data; and selecting a co-watched video from each of the clusters.

29. The computer storage medium of claim 25, further operable to perform operations comprising, for each target video in the plurality of target videos:

determining a score for each cluster generated for the target video; and identifying one or more clusters as being off-topic for the target video according to the scores.

30. The computer storage medium of claim 25, wherein each co-watched cluster is associated with one or more keywords of the respective co-watched videos that belong to the cluster, the computer storage medium further operable to perform operations comprising:

receiving input requesting presentation of a first target video;

identifying content to present with the first target video according to one or more of the keywords associated with the clusters for the first target video; and providing the first target video along with the content.

31. The computer storage medium of claim 30, further operable to perform operations comprising:

receiving data identifying a set of initial videos responsive to a query;

selecting a cluster of co-watched videos for an initial target video selected from the initial videos, wherein the cluster of co-watched videos is selected according to how well the keywords associated with the cluster match the query; and providing one or more of the initial videos and one or more of the co-watched videos from the selected cluster in response to the query.

32. The computer storage medium of claim 25, further operable to perform operations comprising:

receiving data identifying a set of target videos responsive to a query, wherein the target videos are ordered according to a respective result score for each target video, and wherein the target videos include a first target video having a first rank and a second target video having a second rank below the first rank;

determining that the second target video is in a cluster of co-watched videos for the first target video; and providing the target videos in a different order according to a score adjustment for the second target video.

33. The computer storage medium of claim 25, wherein each of one or more co-watched videos for the respective target video was viewed by a user after the user submitted a first search query, and the respective target video was viewed by the user after the user submitted a second search query, and the first search query is similar to the second search query.

34. The computer storage medium of claim 25, wherein one or more of the co-watched videos for the respective target video were selected by a user from a watch page on which the user viewed the respective target video.

35. The computer storage medium of claim 25, wherein the time window is defined by an amount of time.

36. The computer storage medium of claim 25, wherein the time window is defined by a number of videos viewed by the user.

* * * * *